(12) United States Patent
Hong et al.

(10) Patent No.: US 11,799,145 B2
(45) Date of Patent: Oct. 24, 2023

(54) COOLING MEMBER FOR BATTERY MODULE AND BATTERY PACK INCLUDING THE SAME

(71) Applicant: LG Chem, Ltd., Seoul (KR)

(72) Inventors: Soon Chang Hong, Daejeon (KR); Hyoungsuk Lee, Daejeon (KR); Jaehyun Lee, Daejeon (KR)

(73) Assignee: LG Energy Solution, Ltd.

( * ) Notice: Subject to any disclaimer, the term of this patent is extended or adjusted under 35 U.S.C. 154(b) by 148 days.

(21) Appl. No.: 16/962,448

(22) PCT Filed: Mar. 18, 2019

(86) PCT No.: PCT/KR2019/003118
§ 371 (c)(1),
(2) Date: Jul. 15, 2020

(87) PCT Pub. No.: WO2019/225846
PCT Pub. Date: Nov. 28, 2019

(65) Prior Publication Data
US 2021/0066769 A1 Mar. 4, 2021

(30) Foreign Application Priority Data
May 23, 2018 (KR) .................. 10-2018-0058368

(51) Int. Cl.
*H01M 10/613* (2014.01)
*H01M 10/6554* (2014.01)
(Continued)

(52) U.S. Cl.
CPC ....... *H01M 10/613* (2015.04); *H01M 10/625* (2015.04); *H01M 10/6554* (2015.04); *H01M 10/6568* (2015.04); *H01M 2220/20* (2013.01)

(58) Field of Classification Search
None
See application file for complete search history.

(56) References Cited

U.S. PATENT DOCUMENTS 6,394,178 B1 * 5/2002 Yoshida .................. F28F 3/046
165/DIG. 368
2002/0081477 A1 * 6/2002 McLean ................ H01M 8/026
429/492

(Continued)

FOREIGN PATENT DOCUMENTS

| CN | 102893449 A | 1/2013 |
| CN | 105591121 A | 5/2016 |

(Continued)

OTHER PUBLICATIONS

Siddiqui et al., "Effiency energy utilization through proper design of microchannel heat exchanger manifolds: A comprehensive review," Renewable and Sustainable Energy Reviews 74 (2017) 969-1002 (Year: 2017).*

(Continued)

*Primary Examiner* — Amanda J Barrow
(74) *Attorney, Agent, or Firm* — Lerner David LLP

(57) ABSTRACT

A cooling member for a battery module, and a battery pack including the same, according to an exemplary embodiment of the present invention includes: a cooling plate including an upper plate and a lower plate; and a supporter disposed between the upper plate and the lower plate, the supporter defining a plurality of refrigerant flow paths. The lower plate has a refrigerant inflow part and a refrigerant outflow part, and a reinforcing member is formed adjacent to at least one of the refrigerant inflow part and the refrigerant outflow part.

16 Claims, 11 Drawing Sheets

(51) Int. Cl.
*H01M 10/6568* (2014.01)
*H01M 10/625* (2014.01)

(56) References Cited

U.S. PATENT DOCUMENTS

| | | | |
|---|---|---|---|
| 2009/0258289 A1* | 10/2009 | Weber | H01M 10/651 |
| | | | 429/120 |
| 2010/0132930 A1* | 6/2010 | Izenson | F28F 3/12 |
| | | | 165/173 |
| 2011/0300428 A1* | 12/2011 | Sohn | H01M 10/6556 |
| | | | 429/120 |
| 2012/0313559 A1 | 12/2012 | Tonomura et al. | |
| 2013/0040175 A1 | 2/2013 | Yang et al. | |
| 2013/0143093 A1* | 6/2013 | Teng | H01M 10/651 |
| | | | 429/120 |
| 2013/0323623 A1* | 12/2013 | O'Neill | H01M 8/0265 |
| | | | 429/514 |
| 2014/0182322 A1* | 7/2014 | Ito | F28D 9/005 |
| | | | 62/324.1 |
| 2014/0234062 A1 | 8/2014 | Adachi et al. | |
| 2014/0272496 A1* | 9/2014 | Han | H01M 10/613 |
| | | | 429/83 |
| 2015/0236385 A1* | 8/2015 | Park | H01M 10/6556 |
| | | | 429/120 |
| 2015/0333345 A1* | 11/2015 | Hood | H01M 8/2483 |
| | | | 429/514 |
| 2016/0036104 A1* | 2/2016 | Kenney | F28F 3/12 |
| | | | 165/170 |
| 2016/0133950 A1 | 5/2016 | Okabe et al. | |
| 2016/0164148 A1* | 6/2016 | Yum | H01M 10/613 |
| | | | 429/120 |
| 2016/0204486 A1* | 7/2016 | Kenney | B23P 15/26 |
| | | | 29/890.03 |
| 2016/0226291 A1 | 8/2016 | Kratzer et al. | |
| 2016/0254504 A1 | 9/2016 | Kim et al. | |
| 2016/0282059 A1 | 9/2016 | Schiehlen | |
| 2016/0315365 A1* | 10/2016 | Vanderwees | H01M 10/6557 |
| 2017/0324132 A1* | 11/2017 | Kenney | F28F 27/02 |
| 2018/0019508 A1 | 1/2018 | Lee et al. | |
| 2019/0162483 A1* | 5/2019 | Ono | F28F 1/04 |
| 2019/0173064 A1* | 6/2019 | Lee | H01M 50/20 |
| 2020/0006822 A1* | 1/2020 | Shisler | F28D 9/005 |

FOREIGN PATENT DOCUMENTS

| | | |
|---|---|---|
| CN | 105846001 A | 8/2016 |
| CN | 106025423 A | 10/2016 |
| CN | 206022574 U | 3/2017 |
| CN | 107735898 A | 2/2018 |
| JP | 2004006089 A | 1/2004 |
| JP | 2011253801 A | 12/2011 |
| JP | 2012199149 A | 10/2012 |
| JP | 2012256521 A | 12/2012 |
| JP | 2014165071 A | 9/2014 |
| JP | 2015156347 A | 8/2015 |
| JP | 2016091849 A | 5/2016 |
| JP | 2017010648 A | 1/2017 |
| JP | 6090842 B2 | 3/2017 |
| JP | 2018501603 A | 1/2018 |
| JP | 2018063862 A | 4/2018 |
| KR | 20140026961 A | 3/2014 |
| KR | 20150038864 A | 4/2015 |
| KR | 20150081514 A | 7/2015 |
| KR | 101589931 B1 | 1/2016 |
| KR | 101658594 B1 | 9/2016 |
| KR | 20170067240 A | 6/2017 |
| KR | 101806447 B1 | 1/2018 |
| WO | 2013061869 A1 | 5/2013 |

OTHER PUBLICATIONS

Siddiqui et al., "A novel heat exchanger design procedure for photovoltaic panel cooling application: An analytical and experimental evaluation," Applied Energy 239 (2019) 41-56, Available online Feb. 1, 2019 (Year: 2019).*

International Search Report for Application No. PCT/KR2019/003118 dated Jul. 5, 2019, 2 pages.

Search Report dated Feb. 13, 2023 from the Office Action for Chinese Application No. 201980009568.0 dated Feb. 16, 2023, pp. 1-3. [See p. 1, categorizing the cited references].

* cited by examiner

Prior Art

Prior Art

COOLING MEMBER FOR BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2019/003118 filed Mar. 18, 2019, which claims priority from Korean Patent Application No. 10-2018-0058368 filed on May 23, 2018, the entire contents of which are incorporated herein by reference.

TECHNICAL FIELD

The present invention relates to a cooling member for a battery module and a battery pack including the same.

BACKGROUND ART

Rechargeable batteries are attracting attention as a power source for electric vehicles (EV), hybrid electric vehicles (HEV), plug-in hybrid electric vehicles (PHEV), etc. that are presented as a solution to solve air pollution and the like of conventional gasoline vehicles and diesel vehicles using fossil fuels.

While small mobile devices use one or more battery cells per device, medium and large devices such as automobiles use a medium or large battery module in which a plurality of battery cells are electrically connected due to the necessity of high power/capacity.

Since it is preferable for medium and large battery modules to be manufactured with as small a size and weight as possible, a prismatic battery and a pouch type battery, which may have a high integration degree and have a small weight with respect to capacity, are mainly used as a battery cell for medium and large battery modules. Particularly, a pouch-shaped battery using an aluminum laminate sheet or the like as an exterior member has recently attracted a great deal of attention due to its small weight, low manufacturing cost, and ease of shape deformation.

The battery cells constituting medium and large battery modules are composed of a rechargeable battery, and such a high power/capacity rechargeable battery generates a large amount of heat during charge and discharge processes. Particularly, a laminate sheet of the pouch-type battery widely used in a battery module is coated with a polymer material with low thermal conductivity at the surface, so it is difficult to effectively cool the entire battery cell.

If the heat from the battery module generated during the charge and discharge process is not effectively removed, heat accumulation occurs and resultantly the deterioration of the battery module is accelerated, and in some cases, ignition or explosion may be caused. Therefore, in medium or large battery packs for vehicles, which contain a large number of medium and large battery modules and are high power/capacity batteries, or in medium or large battery packs for an electric power storage device, a cooling system for cooling the battery cells built therein is required.

Therefore, battery modules mounted on medium and large battery packs are generally manufactured by a method of stacking a plurality of battery cells at a high density and are formed of a structure in which the battery cells are stacked to be separated by a predetermined interval to remove the heat generated during charge and discharge. For example, to configure a battery module, the battery cells themselves may be stacked sequentially at a predetermined interval without a separate member, or in the case of a battery cell having low mechanical rigidity, one or more combinations of the battery cells may be assembled into a cartridge to form a unit module and a plurality of unit modules may be stacked. If the cartridge is used when configuring the battery module, there is a benefit in that the mechanical rigidity increases, but there is also a drawback in that the overall size of the battery module increases.

Also, a flow path for a refrigerant is formed between the battery cells or the battery modules so as to effectively remove the accumulated heat between the stacked battery cells or the battery modules. However, this structure has a problem in that the entire size of the battery module becomes large because a plurality of the refrigerant flow paths corresponding to a plurality of battery cells must be secured.

Also, by considering the size of the battery module, refrigerant flow paths with a relatively narrow interval are formed as many battery cells are stacked, thereby resulting in the problem that the design of the cooling structure becomes complicated. In other words, refrigerant flow paths with a relatively narrow interval with respect to an inlet of the refrigerant causes high pressure loss, which makes it difficult to design the shape and position of the inlet and outlet of the refrigerant.

Thus, in the case where the cooling structure is a water-cooled cooling system, in a more advanced manner, in a state that the cooling member having a structure including the refrigerant flow path inside faces and contacts the battery module, a method of passing the refrigerant through the refrigerant flow path in the cooling member for heat exchanging is mainly used.

FIG. 1 is an exploded perspective view schematically showing a structure of a conventional cooling member for a battery module, and FIG. 2 is a plan view schematically showing a structure of the base plate of FIG. 1.

Referring to FIG. 1 and FIG. 2, a cooling member 100 includes a base plate 110 and a cover plate 120. In the base plate 110, a receiving part 111 having a structure recessed in a direction from one side to the other side opposite thereto is formed, and a refrigerant inflow part 113 and a refrigerant outflow part 114 are formed on opposite side edges facing each other to communicate with the receiving part 111.

A mounting part 115 for the mounting and fixing of the cooling member 100 is formed at both side edges of the base plate 110 but not at the edges where the refrigerant inflow part 113 and the refrigerant outflow part 114 are formed.

The cover plate 120 is a structure covering the receiving part 111 of the base plate 110, and is formed of a structure having a size and shape corresponding to those of the receiving part 111 except for the mounting part 115 of the base plate 110 in a plan view.

Among the edges of the cover plate 120, parts 121 and 122 corresponding to the refrigerant inflow part 113 and the refrigerant outflow part 114 of the base plate 110 are formed of a structure that is protruded in an outside direction, and a refrigerant inlet 123 and a refrigerant outlet 124 are respectively punched therethrough.

A refrigerant inflow connection port 131 and a refrigerant outflow connection port 132 for connection with a refrigerant conduit are respectively coupled to the refrigerant inlet 123 and the refrigerant outlet 124.

In the receiving part 111 of the base plate 110, a plurality of beads 112 are protruded in the direction of one surface in which the cover plate 120 is disposed so that the refrigerant flow path from the refrigerant inflow part 113 to the refrigerant outflow part 114 may be formed in an 'S' shape.

However, since the refrigerant flow path formed by the beads 112 has a curved structure, a difference in the speed and flow rate of the refrigerant occurs depending on each position of the refrigerant in the flow process of the refrigerant. In particular, since the refrigerant may not pass through the part where the bead 112 is protruded, the cooling effect in the battery module corresponding to the part where the bead 112 is formed is inevitably lowered compared with the remaining part.

Accordingly, in the battery module to which the cooling member 100 is applied, there is a difference in local cooling effect, so that uniform cooling of the battery module using the cooling member 100 is difficult. Moreover, this bead 112 has a predetermined width 143 by itself, so it must be inevitably formed in a wider spacing in order to ensure sufficient refrigerant flow path widths 141 and 142 within the receiving part 111 space of the limited base plate 110.

Thus, when the cooling member 100 is disposed facing the bottom of the battery module, since it may not be possible to exhibit sufficient structural rigidity to withstand the weight of the battery module, the formation of the refrigerant flow path in order to exhibit an efficient cooling effect is limited.

Therefore, there is a high necessity for a technique that may fundamentally solve such a problem.

DISCLOSURE

Technical Solution

According to an exemplary embodiment of the present invention, a cooling member for a battery module with simultaneously improved cooling performance and structural rigidity, and a battery pack including the same, are provided.

However, objects to be solved by the embodiments of the present disclosure are not limited to the above-mentioned problems, and can be variously extended within the scope of the technical idea included in the present invention.

A cooling member for a battery module according to an exemplary embodiment of the present invention includes: a cooling plate including an upper plate and a lower plate; and a supporter disposed between the upper plate and the lower plate and having a plurality of refrigerant flow paths, wherein the lower plate has a refrigerant inflow part and a refrigerant outflow part, and a reinforcing member is formed adjacent to at least one of the refrigerant inflow part and the refrigerant outflow part.

A receiving part of a structure that is recessed in a second surface direction disposed at a side opposite to a first surface facing the upper plate may be formed in the lower plate, and the supporter may be mounted to the receiving part.

The reinforcing member may be formed at a part where the lower plate is not covered by the supporter.

The reinforcing member may be formed adjacent to the refrigerant inflow part, and an entire shape of the reinforcing member may have a pattern structure in which a width is widened along the direction toward the supporter from the refrigerant inflow part.

The edge of the supporter adjacent to the refrigerant inflow part may have a straight structure, and the edge of the supporter adjacent to the refrigerant outflow part has a bent structure.

The plurality of refrigerant flow paths may be disposed to be parallel to each other.

The reinforcing member may be integrally formed with the lower plate.

The reinforcing member may include a plurality of protruded members.

The plurality of protruded members may be disposed along a direction gradually moving away from an imaginary line connecting the refrigerant inflow part and the refrigerant outflow part.

An angle formed between the imaginary line and the protruded member may gradually increase along the direction away from the imaginary line.

The reinforcing member may be integrally formed with the supporter.

The reinforcing member may extend in the direction that the refrigerant flow path extends to be toward at least one of the refrigerant inflow part and the refrigerant outflow part, and the entire shape of the reinforcing member may have a pattern structure in which the width decreases along the direction toward the refrigerant inflow part or the refrigerant outflow part.

The reinforcing member may extend in the direction that the refrigerant flow path extends to be toward at least one of the refrigerant inflow part and the refrigerant outflow part, and the width between the refrigerant flow paths configuring the reinforcing member may be smaller than the width between the refrigerant flow paths disposed at the center part between the refrigerant inflow part and the refrigerant outflow part.

The supporter may have the same shape as the receiving part of the lower plate except for the refrigerant inflow part and the refrigerant outflow part in a plan view.

The cooling member for a battery module may include a first cooling member and a second cooling member connected by a conduit, the lower plate of the first cooling member may include a first refrigerant inflow part and a first refrigerant outflow part, the lower plate of the second cooling member may include a second refrigerant inflow part and a second refrigerant outflow part, and the reinforcing member may be formed adjacent to the first refrigerant inflow part, the first refrigerant outflow part, and the second refrigerant inflow part, respectively.

Each of the edge of the supporter of the first cooling member adjacent to the first refrigerant inflow part, the edge of the support of the first cooling member adjacent to the first refrigerant outflow part, and the edge of the support of the second cooling member adjacent to the second refrigerant inflow part may have a straight structure, and the edge of the support of the second cooling member adjacent to the second refrigerant outflow part may have a bent structure.

A battery pack according to another exemplary embodiment of the present invention may include at least one among the above-described cooling members for a battery module.

Advantageous Effects

According to the exemplary embodiments, the cooling member for the battery module and the battery pack including the same, which increases the cooling performance by adding the separate supporter having the refrigerant flow path on the cooling plate, and simultaneously increases the strength by forming the separate reinforcing member on a weak part as the supporter does not cover the cooling plate, may be realized.

MODE FOR INVENTION

Figure 1:
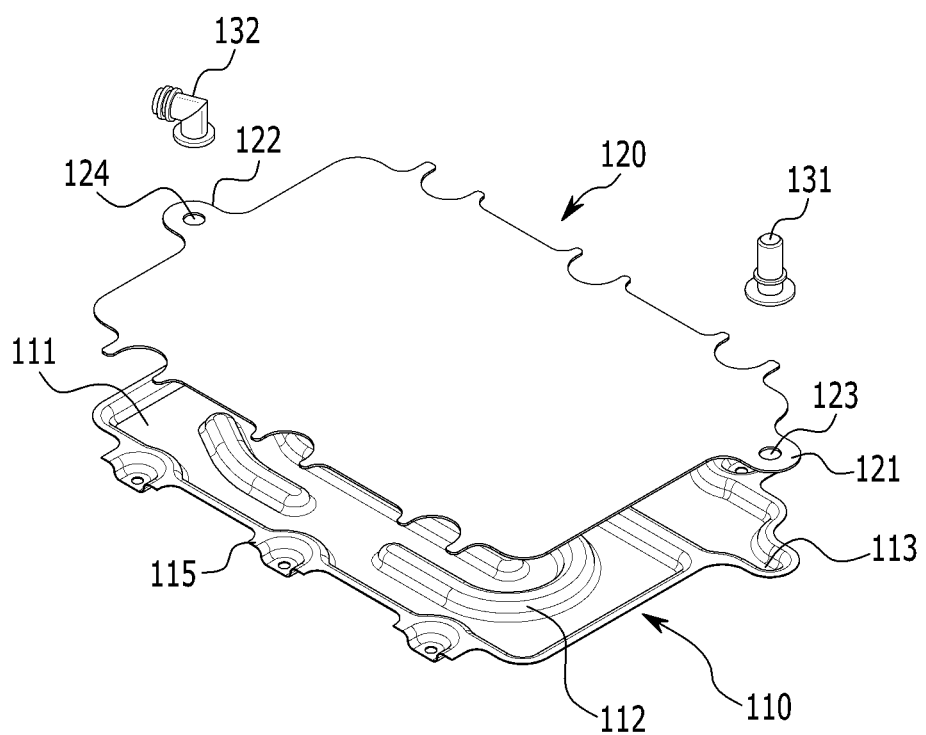
FIG. 1 is an exploded perspective view schematically showing a structure of a conventional cooling member for a battery module.
Figure 2:
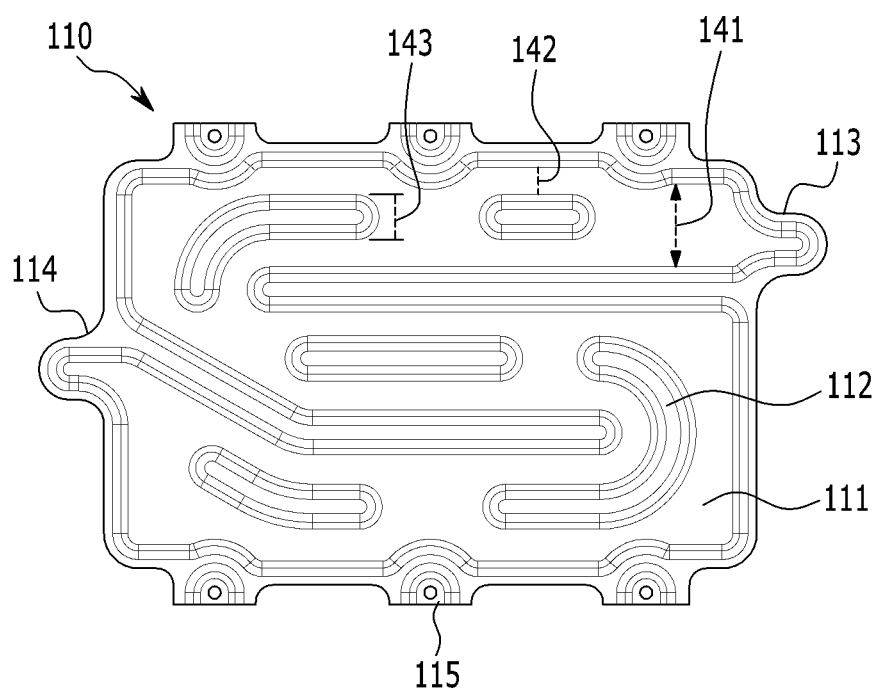
FIG. 2 is a plan view schematically showing a structure of the base plate of FIG. 1.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in the drawings, a size and thickness of each element are arbitrarily represented for better understanding and ease of description, and the present invention is not limited thereto. In the drawings, the thickness of layers, films, panels, regions, etc., are exaggerated for clarity.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" includes positioning on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in the specification, the phrase "in a plan view" means when an object portion is viewed from above, and the phrase "in a cross-sectional view" means when a cross-section taken by vertically cutting an object portion is viewed from the side.

Figure 3:
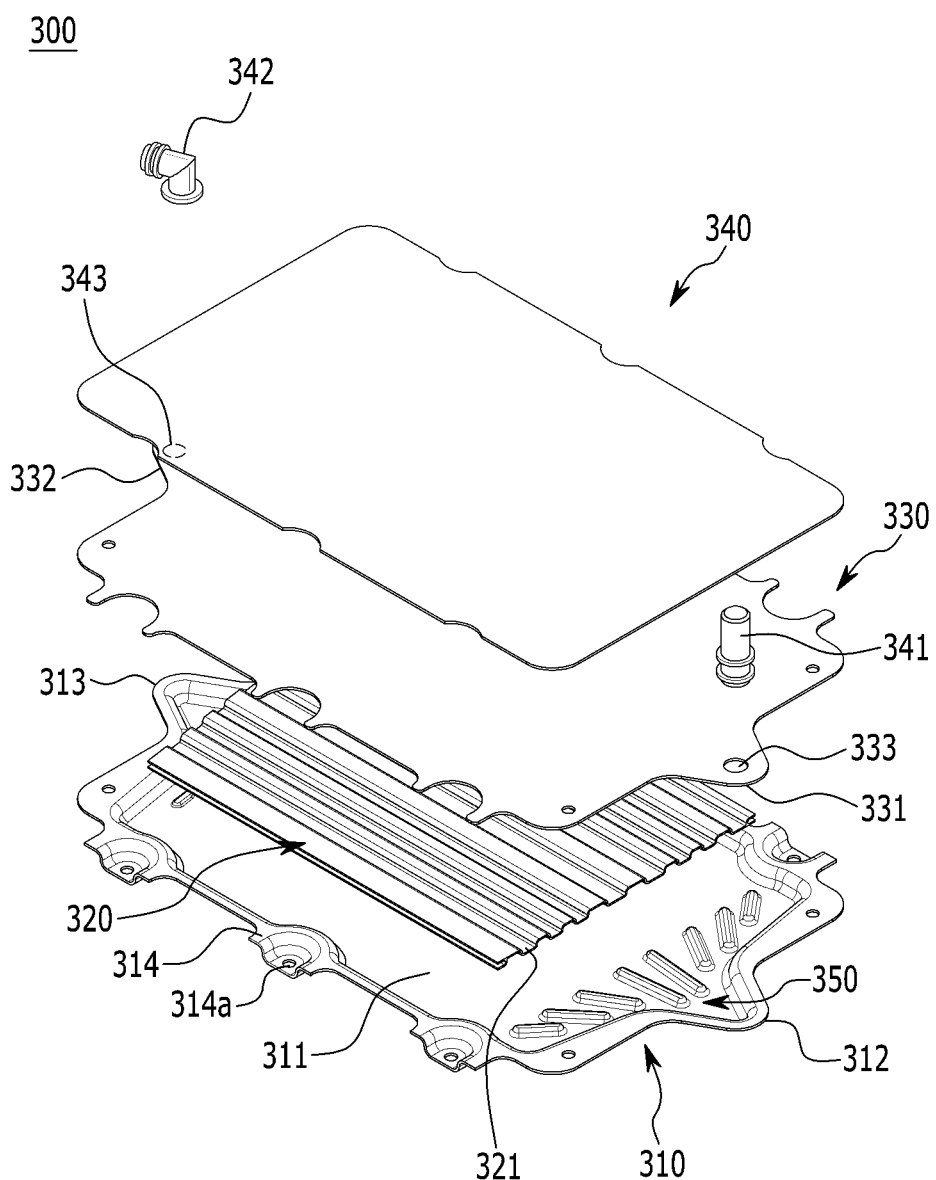
FIG. 3 is an exploded perspective view showing a structure of a cooling member according to an exemplary embodiment of the present invention.
Figure 4:
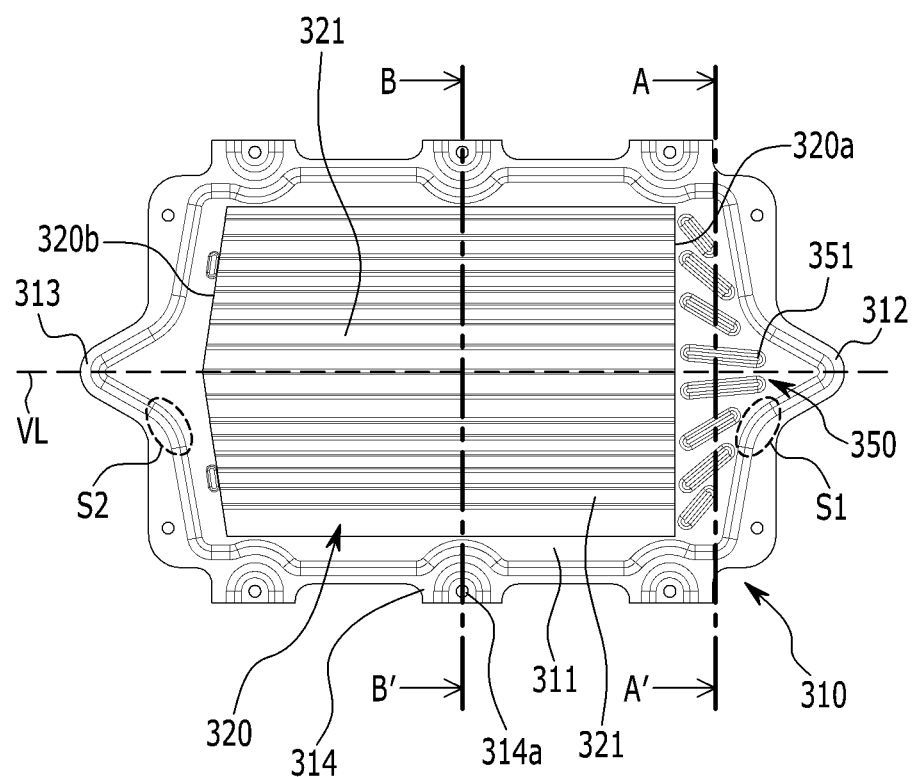
FIG. 4 is a top plan view schematically showing a structure in which a supporter is mounted to a lower plate of FIG. 3.
Figure 5:
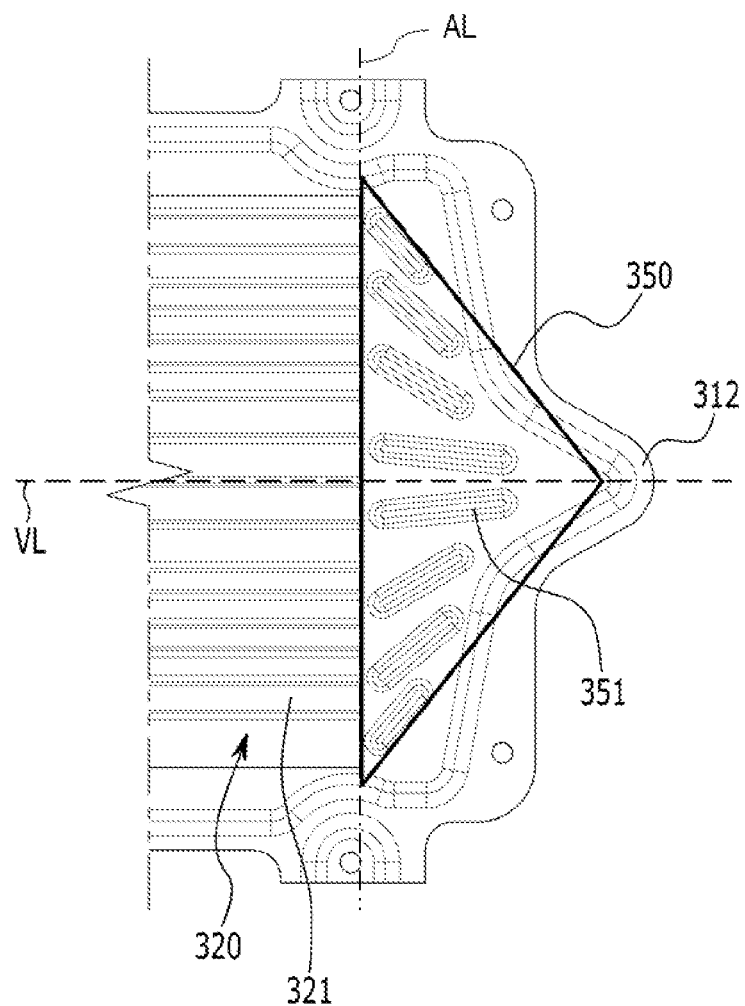
FIG. 5 is a top plan view showing a structure of a reinforcing member of FIG. 4.

FIG. 3 is an exploded perspective view showing a structure of a cooling member according to an exemplary embodiment of the present invention. FIG. 4 is a top plan view schematically showing a structure in which a supporter is mounted to a lower plate of FIG. 3. FIG. 5 is a top plan view showing a structure of a reinforcing member of FIG. 4.

Figure 6:
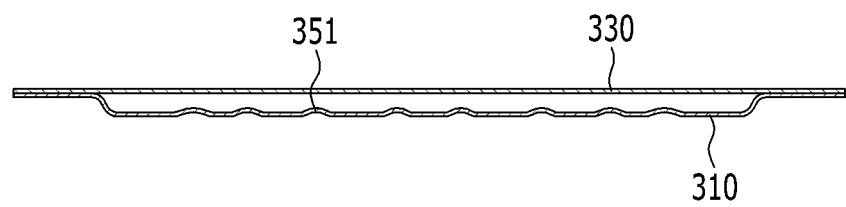
FIG. 6 is a cross-sectional view taken along a line A-A' of FIG. 4.
Figure 7:
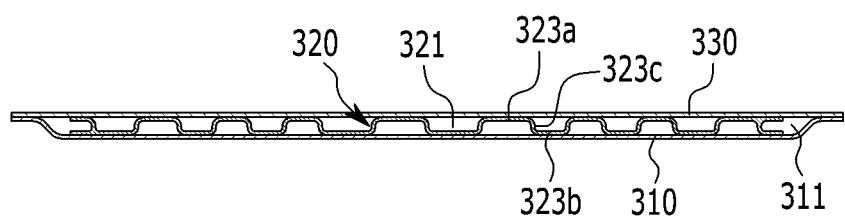
FIG. 7 is a cross-sectional view taken along a line B-B' of FIG. 4.

FIG. 6 is a cross-sectional view taken along a line A-A' of FIG. 4. FIG. 7 is a cross-sectional view taken along a line B-B' of FIG. 4.

Referring to FIG. 3, a cooling member 300 according to an exemplary embodiment of the present invention includes a lower plate 310, a supporter 320 including a plurality of refrigerant flow paths 321, and an upper plate 330. The cooling member 300 of the present exemplary embodiment may further include a thermal transmitting pad 340 on the upper plate 330. The supporter 320 according to the present exemplary embodiment may be formed by an extrusion molding method.

The thermal transmitting pad 340 may include a silicon material or an acryl material, and the thermal transmitting pad 340 transmits heat generated from the battery module mounted on the cooling member 300 according to the present exemplary embodiment to more easily allow heat exchange through the cooling member 300.

Referring to FIG. 3 and FIG. 4, the lower plate 310 has a first surface facing the upper plate 330 and a second surface disposed at a side opposite to the first surface, a receiving part 311 of the structure recessed toward the second surface direction is formed on the lower plate 310, and a refrigerant inflow part 312 and a refrigerant outflow part 313 of a structure communicating with the receiving part 311 are formed at both edges facing each other.

At both edges of the lower plate 310 excluding the edges on which the refrigerant inflow part 312 and the refrigerant outflow part 313 are formed, a plurality of mounting parts 314 for mounting and fixing the cooling member 300 to the battery module and the like are formed. As a fastening apparatus is inserted and coupled in the mounting part 314, a fastening hole 314a is formed for mounting the cooling member 300 according to the present exemplary embodiment to a device such as a battery module.

The mounting part 314 is formed with a structure in which one side part of the mounting part 314 is recessed toward a recess direction of the receiving part 311 with the fastening hole 314a as the center. As shown in FIG. 4, the supporter 320 is mounted in the receiving part 311 of the lower plate 310, and the supporter 320 may have a plate-like structure in which a plurality of linear refrigerant flow paths 321 are formed. The plurality of refrigerant flow paths 321 may be disposed parallel to each other.

The upper plate 330 as a structure covering the receiving part 311 of the lower plate 310 may have a structure having a size and shape corresponding to those of the lower plate 310 having the receiving part 311, except for the mounting part 314 of the lower plate 310 in a plan view.

Among the edges of the upper plate 330, parts 331 and 332 corresponding to the refrigerant inflow part 312 and the refrigerant outflow part 313 of the lower plate 310 may be formed of the structure protruded in the outside direction, and a refrigerant inlet 333 and a refrigerant outlet 334 having a punched structure are respectively formed on the protruded parts 331 and 332 corresponding to the refrigerant inflow part 312 and the refrigerant outflow part 313.

The refrigerant inlet 333 and the refrigerant outlet 334 may be combined with a refrigerant inflow connection port 341 and a refrigerant outflow connection port 342, respectively, for connection to the refrigerant conduit.

In the lower plate 310 of the cooling member 300 according to the present exemplary embodiment, a reinforcing member 350 is formed at the part adjacent to the refrigerant inflow part 312. The reinforcing member 350 is formed at a portion of the lower plate 310 not covered by the supporter 320. Therefore, it is possible to prevent deformation of the cooling member 300, which may occur when the reinforcing member 350 does not cover the supporter 320.

Referring to FIG. 5, the reinforcing member 350 according to the present exemplary embodiment may have a pattern structure in which the width is widened in the overall shape along the direction toward the supporter 320 at the refrigerant inflow part 312. The reinforcing member 350 according to the present exemplary embodiment may be integrally formed with the lower plate 310, and the reinforcing member 350 may include a plurality of protruding members 351 protruded from the first surface of the lower plate 310. Such protruding members 351 may be a resulting material that is protruded while forming the lower plate 310 by a press method.

The plurality of protruded members 350 may be disposed along a direction that is gradually away from an imaginary line VL connecting the refrigerant inflow part 312 and the refrigerant outflow part 313, and an angle formed between the imaginary line VL and the protruded members 350 may be gradually increased along the direction away from the imaginary line VL. As shown in FIG. 5, each of the protruded members 350 has an inflow end closer to the refrigerant inflow part 312 and an outflow end further from the refrigerant inflow part 312, where the outflow ends of the protruding members 350 are arranged along an imaginary linear alignment line AL that is oriented orthogonally to the imaginary line VL. The refrigerant inflowing to the refrigerant inflow part 312 may quickly and accurately reach the refrigerant flow path 321 formed at the supporter 320 by the arrangement structure of the protruded members 350.

The height and area of the plurality of protruded members 350 may be used as a means to control a refrigerant flow rate, and the flow rate may be adjusted according to required conditions by functionally controlling the height and the area.

Again referring to FIG. 4, an edge 320a of the supporter 320 adjacent to the refrigerant inflow part 312 has a straight structure, and an edge 320b of the supporter 320 adjacent to the refrigerant outflow part 313 may have a bent structure. In an example shown in FIG. 4, to ensure the space to form the reinforcing member 350 between the refrigerant inflow part 312 and the supporter 320, the edge 320a of the supporter 320 adjacent to the refrigerant inflow part 312 is separated from the edge of the lower plate 310 in which the refrigerant inflow part 312 is formed by the region occupied by the plurality of reinforcing members 350.

Also, referring to FIG. 5, to have the pattern structure of the reinforcing member 350 as described above, the edge 320a of the supporter 320 adjacent to the refrigerant inflow part 312 may have the substantially straight structure. Alternatively, the edge 320b of the supporter 320 adjacent to the refrigerant outflow part 313 may have the bent structure. In the present exemplary embodiment, since the reinforcing member 350 has the structure that is formed only at the position adjacent to the refrigerant inflow part 312 and is not formed at the position adjacent to the refrigerant outflow part 313, in consideration of the structural rigidity of the cooling member 300, it is preferable that the supporter 320 portion adjacent to the refrigerant outflow portion 313 is formed close to the edge of the lower plate 310. Here, the edge of the lower plate 310 corresponds to the edge of the portion where the refrigerant outflow part 313 is disposed.

Accordingly, in the present exemplary embodiment, as the edge 320b of the supporter 320 adjacent to the refrigerant outflow part 313 is formed of the bent structure, the region between the lower plate 310 in which the refrigerant outflow part 313 is formed and the edge 320b of the supporter 320 adjacent to the refrigerant outflow part 313 may be formed to be narrower than the region between the edge of the lower plate 310 in which the refrigerant inflow part 312 is formed and the edge 320a of the supporter 320 adjacent to the refrigerant inflow part 312. The bent portion depending on the bent structure may be formed at the center part of the edge 320b of the supporter 320 adjacent to the refrigerant outflow part 313.

In the above example, it is described that only one reinforcing member is formed in one lower plate, however it is possible for the reinforcing member to be additionally formed at the lower plate 310 adjacent to the refrigerant outflow part 313 as a variation example. In this case, the edge of the supporter 320 adjacent to the refrigerant outflow part 313 may be formed of the straight structure.

Referring to FIG. 6, the plurality of protruded members 351 are protruded toward the upper plate 330 from the upper surface of the lower plate 310. As described above, the plurality of protruded members 351 may be formed together when forming the lower plate 310 by the press method, and the plurality of protruded members 351 may be one body structure with the lower plate 310.

Referring to FIG. 7, the supporter 320 may form a plurality of refrigerant flow paths 321 by a protrusion and depression structure by repeating a structure of a shape of which a convex part 323a is in contact with the upper plate 330 and a concave part 323b is in contact with the lower plate 310 on a vertical cross-section.

Accordingly, a connection part 323c connecting the convex part 323a and the concave part 323b forms the plurality of refrigerant flow paths 321, and simultaneously supports the receiving part 311 space between the upper plate 330 and the lower plate 310. Accordingly, the structural stability may be improved by reinforcing the rigidity of the cooling member 300.

Figure 8:
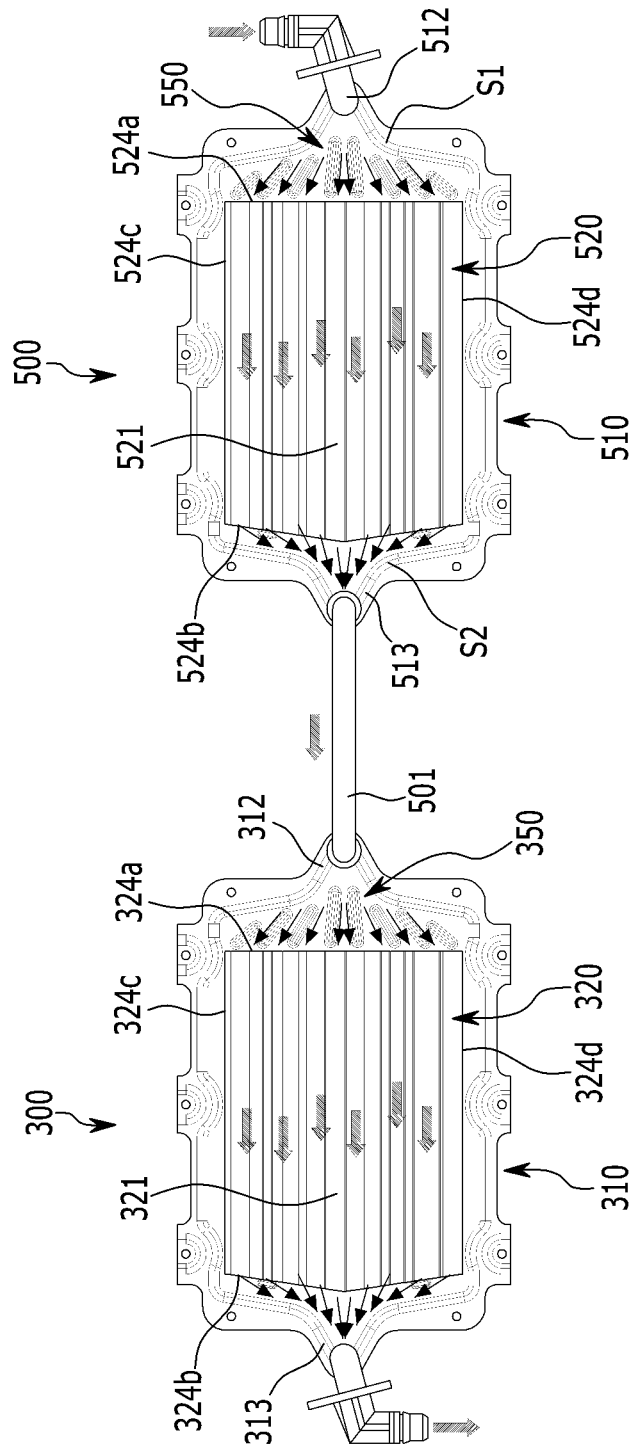
FIG. 8 is a top plan view showing a cooling member for a battery module according to an exemplary embodiment of the present invention.

FIG. 8 is a top plan view showing a cooling member for a battery module according to an exemplary embodiment of the present invention. FIG. 8 shows an example representing a structure in which an additional cooling member is further connected to the cooling member of FIG. 3.

Referring to FIG. 8, a first refrigerant outflow part 513 as the refrigerant outflow part of a first cooling member 500 and the second refrigerant inflow part 312 as the refrigerant inflow part of the second cooling member 300 are connected to each other by a conduit 501 through which the refrigerant may communicate.

The refrigerant may inflow and outflow from the first cooling member 500 to the second cooling member 300, and the cooling member of FIG. 3 may configure the second cooling member 300. Specifically, the refrigerant inflows to a first refrigerant inflow part 512 that is the refrigerant inflow part of the first cooling member 500, the refrigerant outflows to the first refrigerant outflow part 513 that is the refrigerant outflow part of the first cooling member 500 after passing through a first refrigerant flow path 521, the refrigerant inflows to the second refrigerant inflow part 312 that is the refrigerant inflow part of the second cooling member 300 through the conduit 501, and the refrigerant outflows to the second refrigerant outflow part 313 that is the refrigerant outflow part of the second cooling member 300 after passing through the second refrigerant flow path 321.

A first supporter 520 of the first cooling member 500 is formed of a structure having four edges 524a, 524b, 524c, and 524d in a plan view, and the refrigerant flow paths 521 are formed in parallel along the direction from the first edge 524a disposed adjacent to the refrigerant inflow part 512 to the second edge 524b disposed adjacent to the first refrigerant outflow part 513. Here, the second edge 524b disposed adjacent to the first refrigerant outflow part 513 may include the bent part, and the bent part may be formed at the center part of the second edge 524b. The bent part allows the refrigerant passing through the first cooling member 500 to smoothly move to the second cooling member 300, thereby shortening the refrigerant time.

Similarly, the second supporter 320 of the second cooling member 300 is formed of the structure having four edges 324a, 324b, 324c, and 324d, and the refrigerant flow paths 321 are formed in parallel along the direction from the first edge 324a disposed adjacent to the refrigerant inflow part 312 to the second edge 324b adjacent to the refrigerant outflow part 313.

The first refrigerant inflow part 512 that is the refrigerant inflow part of the first cooling member 500 may be disposed at the center part on the edge of a corresponding lower plate 510, and the first refrigerant outflow part 513 may be disposed at the center part on the edge of the corresponding lower plate 510. The position of the first refrigerant outflow part 513 is not limited thereto, and may be biased in the third edge 524c direction or the fourth edge 524d direction of the supporter 520.

The first edge 524a and the second edge 524b of the first supporter 520 are spaced apart from the first refrigerant inflow part 512 and the first refrigerant outflow part 513 by a predetermined interval so as to induce the smooth inflow and outflow of the refrigerant. However, the first edge 524a of the first supporter 520 adjacent to the first refrigerant inflow part 512 has the straight structure, and the second edge 524b of the first supporter 520 adjacent to the first refrigerant outflow part 513 may have the bent structure. The reinforcing member 550 is formed between the first edge 524a of the first supporter 520 having the straight structure and the first refrigerant inflow part 512, and the part having the bent structure of the first supporter 520 without a separate reinforcing member is disposed between the second edge 524b of the first supporter 520 having the bent structure and the first refrigerant outflow part 513.

Receiving part interior circumferences of the lower plate 510 corresponding to the first edge 524a and the second edge 524b respectively include inclination surfaces S1 and S2 recessed in the first refrigerant inflow part 512 and in the first refrigerant outflow part 513 direction so as to induce the smooth inflow and outflow of the refrigerant.

The second refrigerant inflow part 312 that is the refrigerant inflow part of the second cooling member 300 may be disposed at the center part on the edge of the corresponding lower plate 310, and the second refrigerant outflow part 313 may be disposed at the center part on the edge of the corresponding lower plate 310. The position of the second refrigerant outflow part 313 is not limited thereto, and may be biased to the third edge 324c direction or the fourth edge 324d direction of the supporter 320.

The remaining structure of the second cooling member 300 is the same as that of the first cooling member 500, so a detailed description thereof is omitted.

Figure 9:
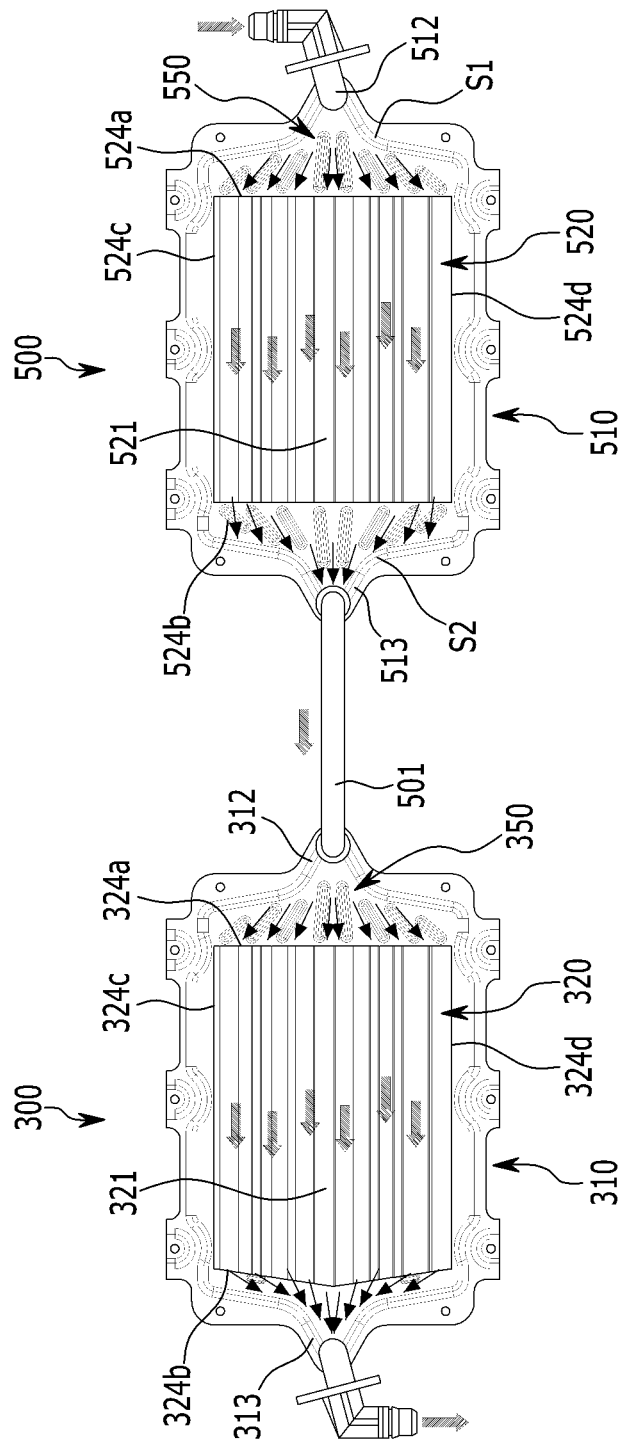
FIG. 9 is a top plan view showing a variation example of the cooling member of FIG. 8.

FIG. 9 is a top plan view showing a modified example of the cooling member of FIG. 8.

Referring to FIG. 9, an example to be described in FIG. 9 is the same as most of the example described in FIG. 8, however there is a difference that a reinforcing member 550 is additionally formed between the second edge 524b of the first supporter 520 and the refrigerant outflow part 513. Also, the second edge 524b of the first supporter 520 adjacent to the refrigerant outflow part 513 may have the straight structure, not the bent structure. In the cooling member according to the present exemplary embodiment, in the case that the plurality of cooling members are connected, when considering a point that the refrigerant discharged through the refrigerant outflow part 513 of the first cooling member 500 again enters the second cooling member 300 for performing the cooling action, a reinforcing member 550 may be additionally formed between the second edge 524b of the first supporter 520 and the refrigerant outflow part 513 to adjust the path and the flow speed of the refrigerant. Thus, the cooling efficiency may be further improved.

In addition to the differences described above, the contents described with reference to FIG. 8 may all be applied to the present exemplary embodiment.

Figure 10:
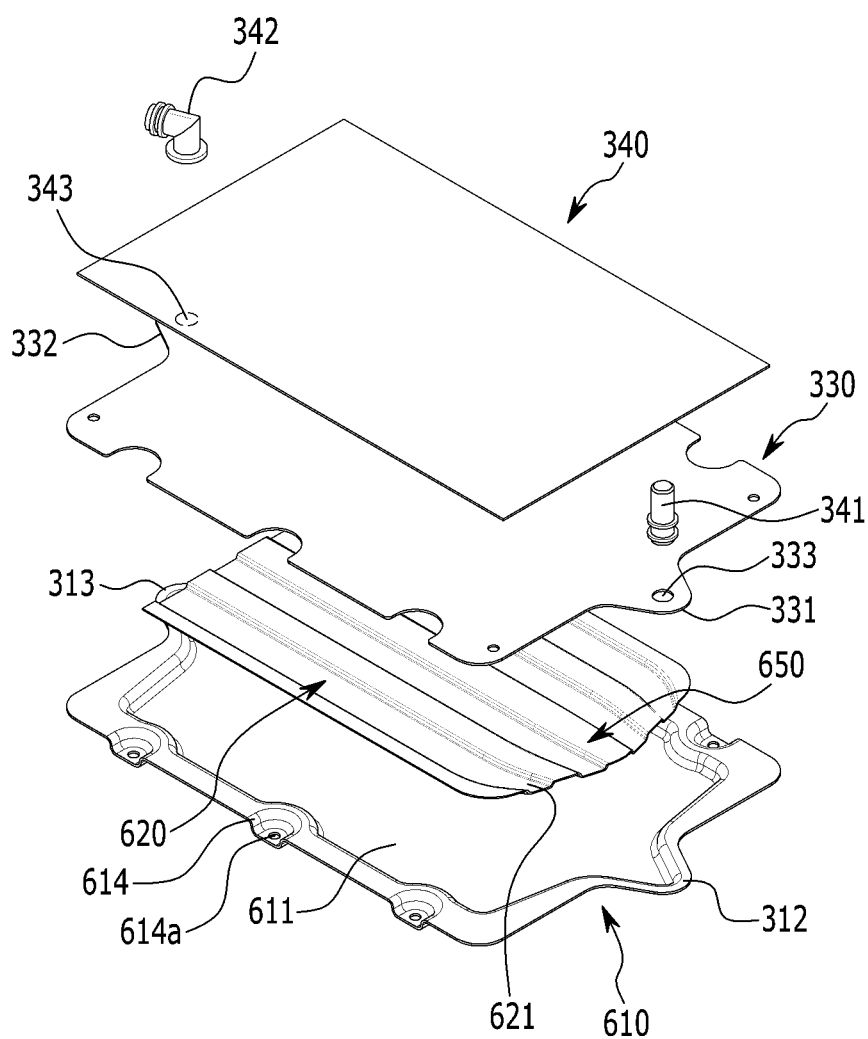
FIG. 10 is an exploded perspective view showing a structure of a cooling member according to an exemplary embodiment of the present invention.
Figure 11:
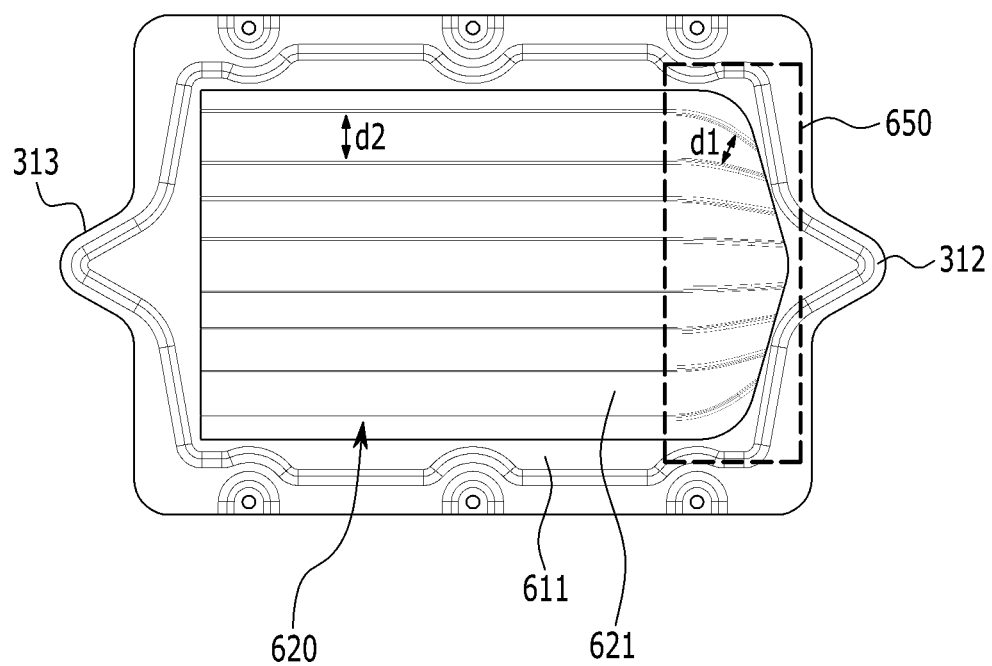
FIG. 11 is a top plan view schematically showing a structure in which a supporter is mounted to a lower plate of FIG. 10.

FIG. 10 is an exploded perspective view showing a structure of a cooling member according to an exemplary embodiment of the present invention. FIG. 11 is a top plan view schematically showing a structure in which a supporter is mounted to a lower plate of FIG. 10.

An example to be described in FIG. 10 and FIG. 11 is the same as most of the example described with reference to FIG. 3 and FIG. 4, however there are differences in a method of forming the reinforcing member and the structure of the reinforcing member manufactured according thereto, and are mainly described.

Referring to FIG. 10 and FIG. 11, in a cooling member 600 according to the present exemplary embodiment, a supporter 620 is mounted on a receiving part 611 of a lower plate 610, and the supporter 620 includes a plurality of refrigerant flow paths 621. The supporter 620 according to the present exemplary embodiment may include a first region adjacent to the refrigerant inflow part 312, a second region adjacent to the refrigerant outflow part 313, and a third region disposed between the first region and the second region. In the second region and the third region, the plurality of refrigerant flow paths 621 may be disposed to be parallel to each other and have a straight structure. In the first region, the plurality of refrigerant flow paths 621 may be bent toward the part where the refrigerant inflow part 312 is disposed. In detail, a reinforcing member 650 according to the present exemplary embodiment is made of a structure extending toward the refrigerant inflow part 312 along the direction that the plurality of refrigerant flow paths 621 disposed in the second region extend. The entire shape of the reinforcing member 650 may have a patterned structure in which the width is narrowed along the direction toward the refrigerant inflow part 312. In this case, a width d1 between the refrigerant flow paths 621 constituting the reinforcing member 650 may be smaller than a width d2 between the refrigerant flow paths 621 disposed in the second region corresponding to the center part between the refrigerant inflow part 312 and the refrigerant outflow part 313.

The supporter 620 according to the present exemplary embodiment may have the same shape as the receiving part 611 of the lower plate 620 except for the refrigerant inflow part 312 and the refrigerant outflow part 313 in a plan view.

In the present exemplary embodiment, the reinforcing member 650 may be integrally formed with the supporter 620. The pressing method may be used to integrally form the supporter 620 and the reinforcing member 650.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

300: cooling member
310, 510: lower plate
320, 520: supporter
321: refrigerant flow path
330: upper plate
350: reinforcing member

The invention claimed is:

1. A battery module system, comprising:
a battery module; and
a cooling member on which the battery module is mounted, the cooling member including:
 a cooling plate including an upper plate and a lower plate, the cooling plate arranged to abut the battery module mounted on the cooling member so as to transmit heat generated from the abutting battery module to a cooling medium flowing through an interior of the cooling plate between the upper plate and the lower plate; and
 a supporter disposed between the upper plate and the lower plate, the supporter defining a plurality of cooling medium flow paths,
 wherein the lower plate has a cooling medium inflow part and a cooling medium outflow part, and wherein a reinforcing member is formed adjacent to at least one of the cooling medium inflow part and the cooling medium outflow part, the reinforcing member including a plurality of protruding members,
 wherein each of the plurality of protruding members defines a linear segment extending between an inflow end and an outflow end, the inflow end being closer to the cooling medium inflow part than the outflow end, the linear segments being oriented obliquely to an imaginary line connecting the cooling medium inflow part and the cooling medium outflow part, such that the inflow end of each linear segment is closer to the imaginary line than the outflow end of the respective linear segment,
 wherein the plurality of protruding members are arranged such that a respective angle formed between the imaginary line and the linear segment of each of the protruding members increases with increasing distance between the imaginary line and the respective protruding member, and
 wherein the outflow ends of the plurality of protruding members are arranged along an imaginary linear alignment line oriented orthogonally to the imaginary line.

2. The battery module system of claim 1, wherein the lower plate is recessed in a recess direction away from the upper plate so as to define a receiving part, and the supporter is mounted in the receiving part.

3. The battery module system of claim 1, wherein the reinforcing member is formed at a part of the lower plate not covered by the supporter.

4. The battery module system of claim 3, wherein the reinforcing member is formed adjacent to the cooling medium inflow part, and the reinforcing member has a shape such that a width of the reinforcing member gets wider along a direction extending toward the supporter from the cooling medium inflow part.

5. The battery module system of claim 4, wherein an edge of the supporter adjacent to the cooling medium inflow part is straight, and an edge of the supporter adjacent to the cooling medium outflow part includes at least two portions that extend at an oblique angle to one another.

6. The battery module system of claim 1, wherein the plurality of cooling medium flow paths are parallel to each other.

7. The battery module system of claim 1, wherein the reinforcing member is integrally formed with the lower plate.

8. The battery module system of claim 1, wherein the reinforcing member is integrally formed with the supporter.

9. The battery module system of claim 8, wherein the reinforcing member extends from the supporter along the same direction as the plurality of cooling medium flow paths, and wherein the reinforcing member has a shape such that a width of the reinforcing member decreases along a direction extending from the supporter toward either the cooling medium inflow part or the cooling medium outflow part.

10. The battery module system of claim 8, wherein the reinforcing member extends from the supporter along the same direction as the plurality of cooling medium flow paths, the reinforcing member defining a plurality of the cooling medium flow paths, and wherein a distance between any two of the cooling medium flow paths defined through a portion of the reinforcing member is smaller than a distance between the two cooling medium flow paths extending through the supporter.

11. The battery module system of claim 8, wherein the supporter has the same shape as a receiving part of the lower plate along a plane orthogonal to the recess direction, not including the cooling medium inflow part and the cooling medium outflow part.

12. The battery module system of claim 1, further comprising:
a second cooling member connected by a conduit to the cooling member, the second cooling member including:
 a second cooling plate including an upper plate and a lower plate; and
 a second supporter disposed between the upper plate and the lower plate of the second cooling plate, the second supporter defining a plurality of cooling medium flow paths, wherein the lower plate of the cooling member includes a first cooling medium inflow part and a first cooling medium outflow part, wherein the lower plate of the second cooling member includes a second cooling medium inflow part and a second cooling medium outflow part, and wherein the reinforcing member is formed adjacent to the first cooling medium inflow part, the first cooling medium outflow part, and the second cooling medium inflow part.

13. The battery module system of claim 12, wherein an edge of the supporter adjacent to the first cooling medium inflow part, an edge of the supporter adjacent to the first cooling medium outflow part, and an edge of the second supporter adjacent to the second cooling medium inflow part are each straight, and wherein an edge of the second supporter adjacent to the second cooling medium outflow part includes at least two portions that extend at an oblique angle to one another.

14. A battery pack including the battery module system of claim 1.

15. The battery module system of claim 1, further comprising a thermal transmitting pad positioned on the upper plate of the cooling member.

16. The battery module system of claim 15, wherein the thermal transmitting pad includes a silicon material or an acryl material.

\* \* \* \* \*